United States Patent
Hartman et al.

(10) Patent No.: US 10,337,648 B2
(45) Date of Patent: Jul. 2, 2019

(54) FIXED CONE SLEEVE VALVE WITH FINGER EXTENSIONS ON SLEEVE GATE FOR CAVITATION SUPPRESSION

(71) Applicants: Thomas A. Hartman, St. Louis, MO (US); Brian T. Hartman, Mesa, AZ (US); Catherine A. Hartman, Mesa, AZ (US)

(72) Inventors: Thomas A. Hartman, St. Louis, MO (US); Brian T. Hartman, Mesa, AZ (US); Catherine A. Hartman, Mesa, AZ (US)

(*) Notice: Subject to any disclaimer, the term of this patent is extended or adjusted under 35 U.S.C. 154(b) by 0 days.

(21) Appl. No.: 15/617,552

(22) Filed: Jun. 8, 2017

(65) Prior Publication Data
US 2018/0355981 A1    Dec. 13, 2018

(51) Int. Cl.
*F16K 1/12* (2006.01)
*F16K 1/38* (2006.01)
*F16K 1/42* (2006.01)
*F16K 47/14* (2006.01)
*F16K 47/08* (2006.01)

(52) U.S. Cl.
CPC ............... *F16K 47/08* (2013.01); *F16K 1/12* (2013.01); *F16K 1/385* (2013.01)

(58) Field of Classification Search
CPC ... F16K 1/123; F16K 1/38; F16K 1/42; F16K 47/14; Y10T 137/0486; Y10T 137/3367; Y10T 137/7976
See application file for complete search history.

(56) References Cited

U.S. PATENT DOCUMENTS

| | | | |
|---|---|---|---|
| 4,487,172 A * | 12/1984 | Suhre | F01L 5/10 123/76 |
| 5,116,252 A | 5/1992 | Hartman | |
| 5,950,660 A | 9/1999 | Hartman et al. | |
| 6,296,009 B1 | 10/2001 | Hartman et al. | |
| 6,681,792 B2 * | 1/2004 | Edward | F16K 3/265 137/15.06 |
| 7,066,447 B2 | 6/2006 | McCarty et al. | |
| 7,493,912 B2 | 2/2009 | Hartman et al. | |
| 7,708,024 B2 | 5/2010 | Hartman et al. | |
| 8,944,085 B2 * | 2/2015 | Smick | F16H 25/00 137/15.18 |
| 2015/0300503 A1 | 10/2015 | Richardson et al. | |

FOREIGN PATENT DOCUMENTS

WO    2007/146744 A2    12/2007

OTHER PUBLICATIONS

International Search Report and Written Opinion for PCT/US2018/034883 dated Aug. 24, 2018.

* cited by examiner

*Primary Examiner* — Craig M Schneider
*Assistant Examiner* — Kevin R Barss
(74) *Attorney, Agent, or Firm* — Thompson Coburn LLP

(57) ABSTRACT

A fixed cone sleeve valve has a conically shaped valve body and a sleeve gate movable relative to the valve body to define open and closed positions of the valve. An extension member is provided at the downstream distal end of the sleeve gate. The extension member extends radially outward and axially downstream from the distal end of the sleeve gate. The extension member has outer and inner surfaces with openings extending between the outer and inner surfaces. The extension member is arranged on the sleeve gate in a manner to allow communication through the openings into the flow path when the sleeve gate is in the open position.

19 Claims, 7 Drawing Sheets

FIXED CONE SLEEVE VALVE WITH FINGER EXTENSIONS ON SLEEVE GATE FOR CAVITATION SUPPRESSION

BACKGROUND OF THE INVENTION

This disclosure relates generally to fixed cone sleeve valves. Fixed cone sleeve valves have been used for many years as free discharge valves. For instance, a fixed cone sleeve valve is shown and described in U.S. Pat. No. 5,950,660, the disclosure of which is incorporated by reference. Fixed cone sleeve valves have been used primarily as control valves in reservoir discharge and turbine bypass systems because of their suitability for braking high pressure heads. A typical fixed cone sleeve valve consists of a cylindrical interior conduit that is surrounded by a thin, axially moveable sleeve. A conical valve seat with its apex pointing upstream is held in place downstream of the interior conduit by a series of radially extending vanes. The valve is operated by axially sliding the sleeve toward or away from the conical valve seat. The sleeve is moved axially up against the conical valve seat to close the valve, and is moved away from the conical valve seat to open the valve. The jet issuing from the valve resembles a hollow diverging cone that continues to spread out through the atmosphere. The energy of the jet is eventually dissipated by air friction as it is broken down into a fine spray. This helps to prevent erosion of downstream banks and plunge pools.

BRIEF DESCRIPTION OF THE DRAWINGS

Corresponding reference characters indicate corresponding parts throughout the several views of the drawings.

DETAILED DESCRIPTION

Figure 1:
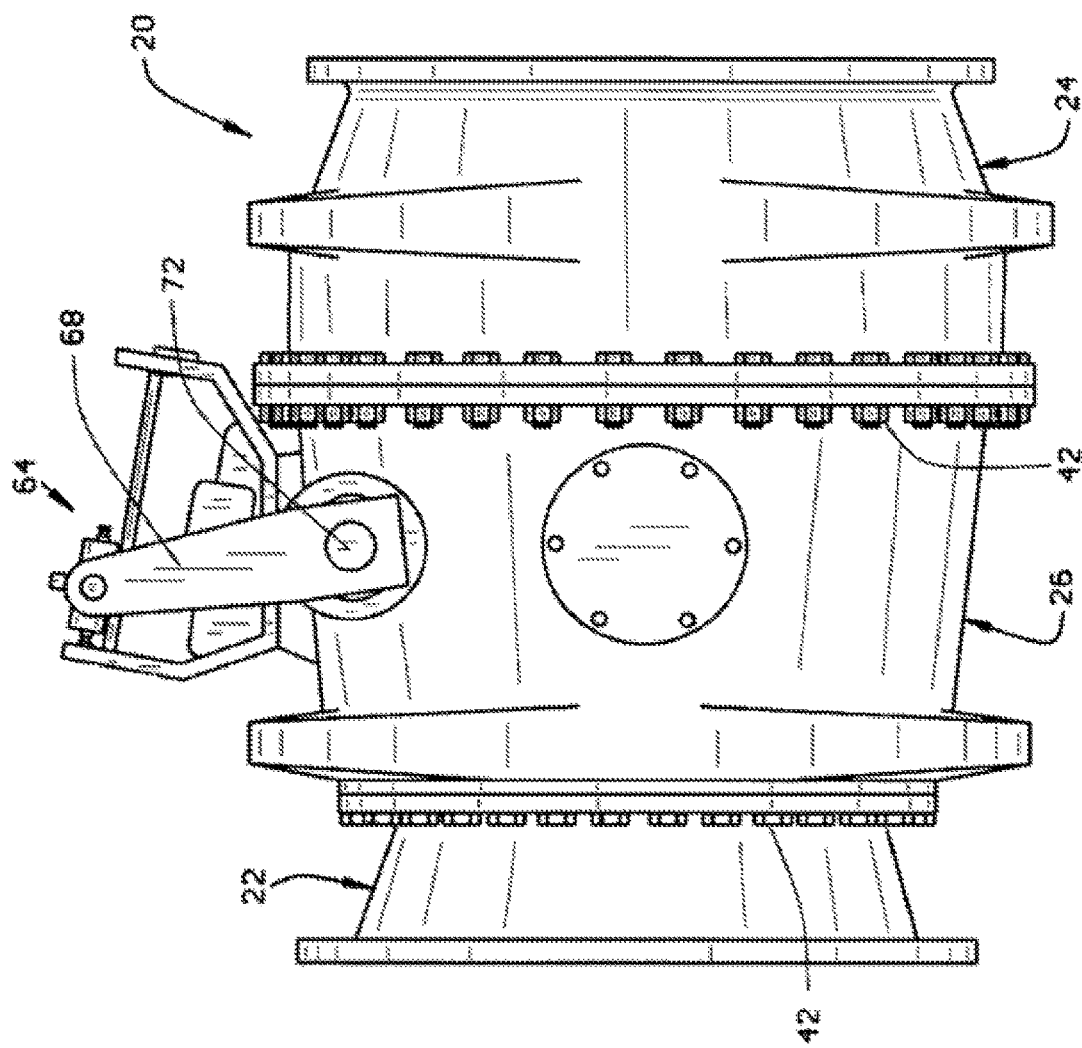
FIG. 1 is a side elevation view of a fixed cone sleeve valve housing.

FIGS. 1-4 show one embodiment of a fixed cone valve comprising a housing assembly 20, which includes an upstream length of conduit 22, a downstream length of conduit 24, and a valve housing 26 connected between the upstream conduit 22 and the downstream conduit 24 configured to direct a flow of liquid that exits the upstream conduit 22 and flows through the valve housing 26 and into the downstream conduit 24. The upstream conduit 22 has an input end 30 and an output end 32, and a hollow interior volume between the input end 30 and the output end 32. The valve housing 26 has an upstream end 34 and a downstream end 36 and a hollow interior volume therebetween. The output end 32 of the upstream conduit 22 is connected to the upstream end 34 of the valve housing 26. The output end 32 of the upstream conduit 22 and the upstream end 34 of the valve housing 26 may each have mating flanges that are connected to one another by mechanical fasteners 42.

The downstream conduit 24 has an input end 38 and an output end 40, and a hollow interior volume between the input end 38 and the output end 40. The input end 38 of the downstream conduit 24 is connected to the downstream end 36 of the valve housing 26. Preferably, the downstream end 36 of the valve housing 26 and the input end 38 of the downstream conduit 24 each have mating flanges that are connected to one another by mechanical fasteners 42. The input end 38 of the downstream conduit 24, together with the downstream end 36 of the valve housing 26, defines a plane P1 between the downstream end 36 of the valve housing 26 and the input end 38 of the downstream conduit 24.

Preferably, the upstream conduit 22 and the downstream conduit 24 are connected to the valve housing 26 in a manner so that the interior volume of the valve housing 26 is sealed from an exterior environment of the valve housing 26. The upstream end 34 of the valve housing 26 is connected to the upstream conduit 22 so that the valve housing 26 receives all of the flow of liquid through the upstream conduit 22. The downstream end 36 of the valve housing 26 is connected to the downstream conduit 24 to direct all of the flow of liquid received in the valve housing 26 into the downstream conduit 24. Thus, the upstream conduit 22, downstream conduit 24 and valve housing 26, together, provide a closed liquid flow control system having a hollow interior that is sealed from the exterior environment.

The cross-sectional area of the interior volume of the upstream conduit 22 at its input end 30 may be larger than the cross-sectional area of the interior volume of the upstream conduit 22 at its output end 32. The interior volume of the upstream conduit 22 has a cross-sectional area at its input end 30 that may be equal to the cross-sectional area of the downstream conduit 24 at its output end 40. The cross-sectional area of the interior volume of the valve housing 26 at its downstream end 36 may be larger than a cross-sectional area of the interior volume of the valve housing 26 at its upstream end 34.

A fixed cone sleeve valve assembly is represented generally by the reference numeral 50. The fixed cone sleeve valve assembly 50 is mounted within the hollow interior volume of the valve housing 26 and, as explained below in more detail, is adapted for use in the closed system as an in-line flow control valve. The fixed cone sleeve valve assembly 50 comprises an inner conduit 52, a cone valve seat 54, and a sleeve gate 56. The inner conduit 52 has an interior volume in communication with the upstream conduit 22. The cone valve seat 54 is fixedly connected to the inner conduit 52 and is positioned adjacent an output end 58 of the inner conduit 52. The cone valve seat 54 is connected to the interior surface of the inner conduit 52 by a plurality of radially extending vanes 44, which extend from the cone valve seat 54 to the interior surface of the inner conduit 52. The vanes may be slightly angled in order to create a slightly torsional flow, which may help to reduce vibration of the vanes and potential damage to the vanes. A base 60 of the cone valve seat 54 is positioned in the plane P1, which is defined by the interface of the downstream end 36 of the valve housing 26 and the input end 38 of the downstream conduit 24. An apex 61 of the cone valve seat 54 is pointed upstream of the base 60.

The sleeve gate 56 surrounds the inner conduit 52 and, as described below more fully, is adapted for axial movement relative to the inner conduit between a closed position and an open position. In the closed position (shown in FIG. 3), the sleeve gate 56 engages around the base 60 of the cone valve seat 54 and blocks the flow of liquid from the inner conduit 52. In the open position (shown in FIG. 4), the sleeve gate 56 is disengaged from the base 60 of the cone valve seat 54 and unblocks the flow of liquid from the inner conduit 52.

Figure 3:
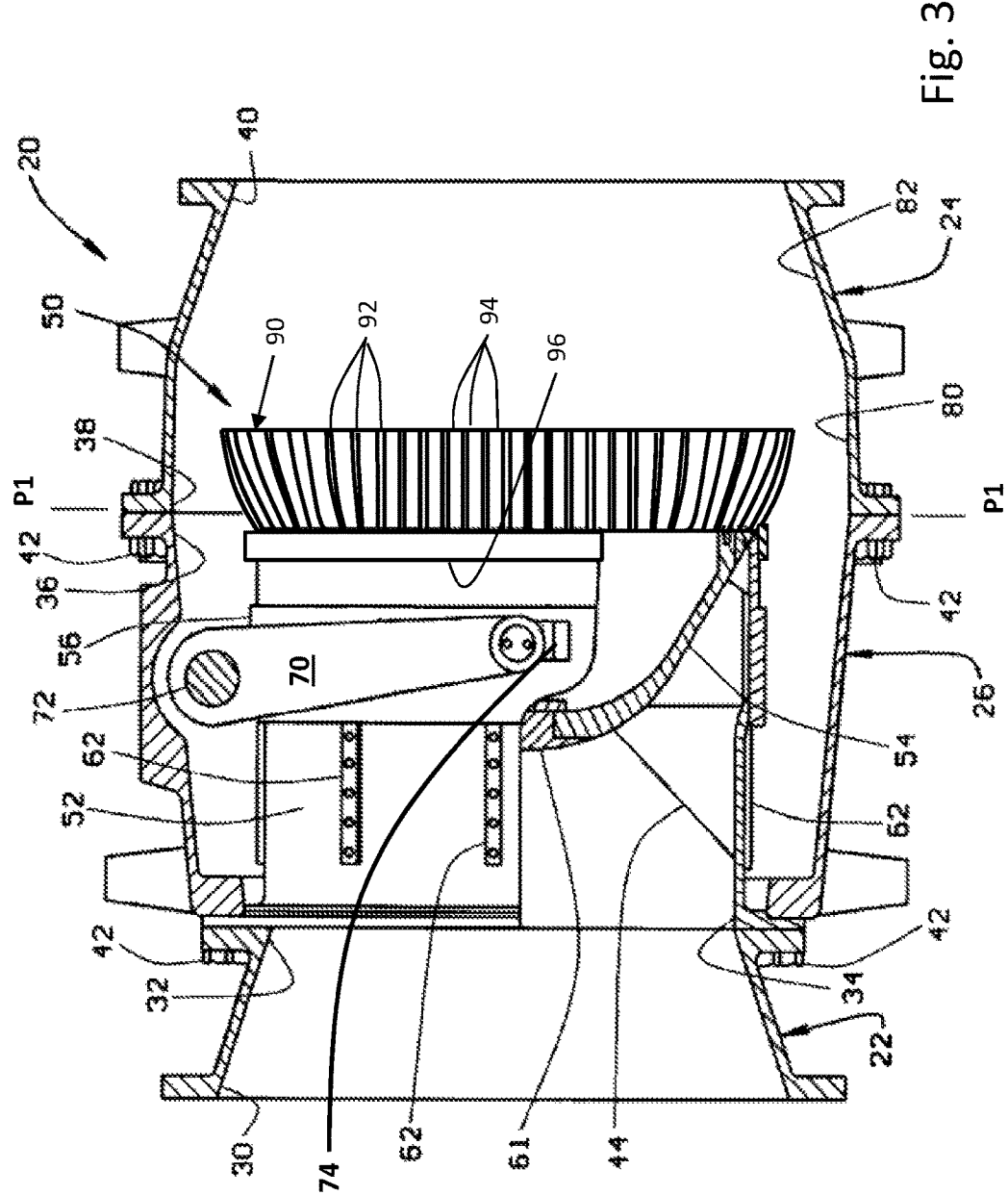
FIG. 3 is a partial cross-sectional elevation view of the fixed cone sleeve valve housing of FIG. 1, shown with a fixed cone sleeve valve in a closed position.

As shown in FIG. 3, the inner conduit 52 preferably includes a plurality of sleeve valve guides 62 spaced around its exterior surface. The guides 62 are connected to and extend axially along the exterior surface of the inner conduit 52. Preferably, the interior surface of the sleeve gate 56 includes a plurality of axially extending grooves (not shown) which are configured to receive the guides 62 to thereby guide the axial movement of the sleeve gate 56 relative to the inner conduit 52 as the sleeve gate moves between its open and closed positions.

Figure 2:
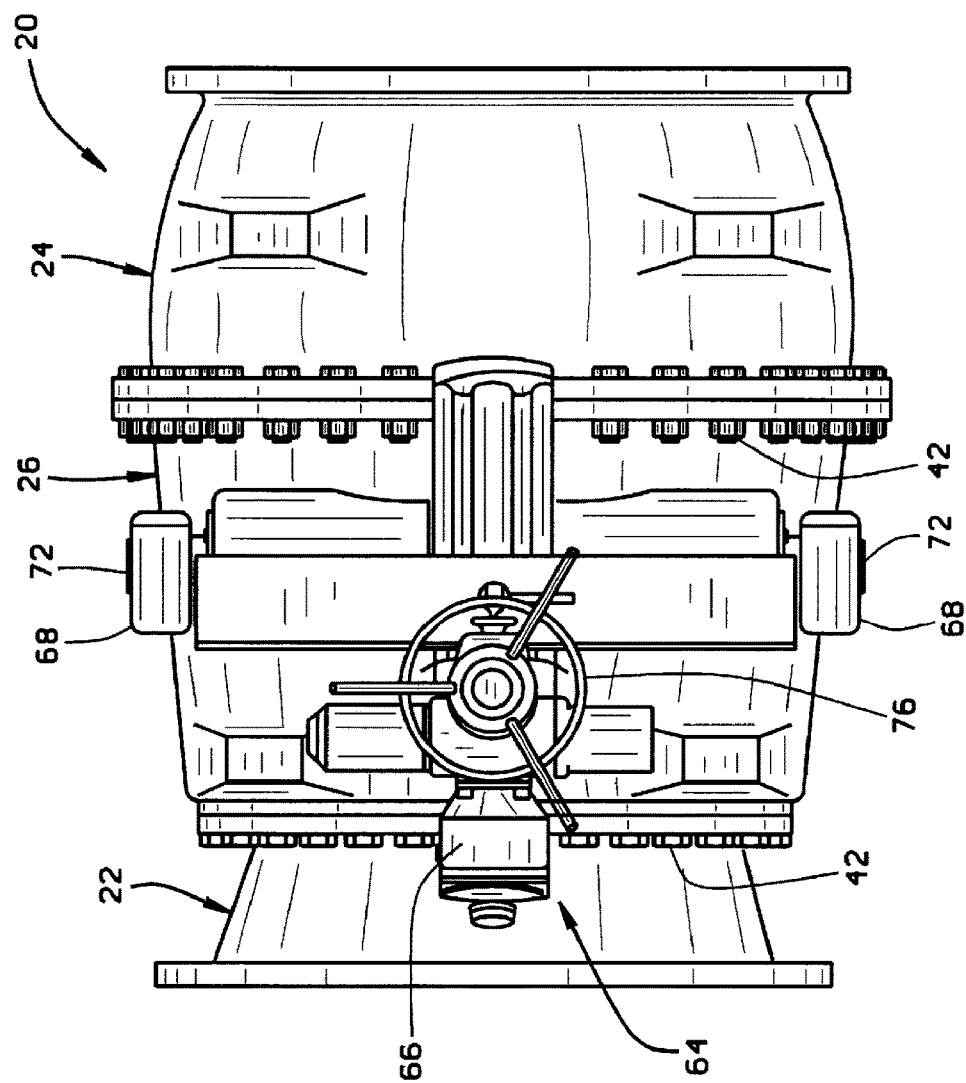
FIG. 2 is a top plan view of the fixed cone sleeve valve housing of FIG. 1.
Figure 4:
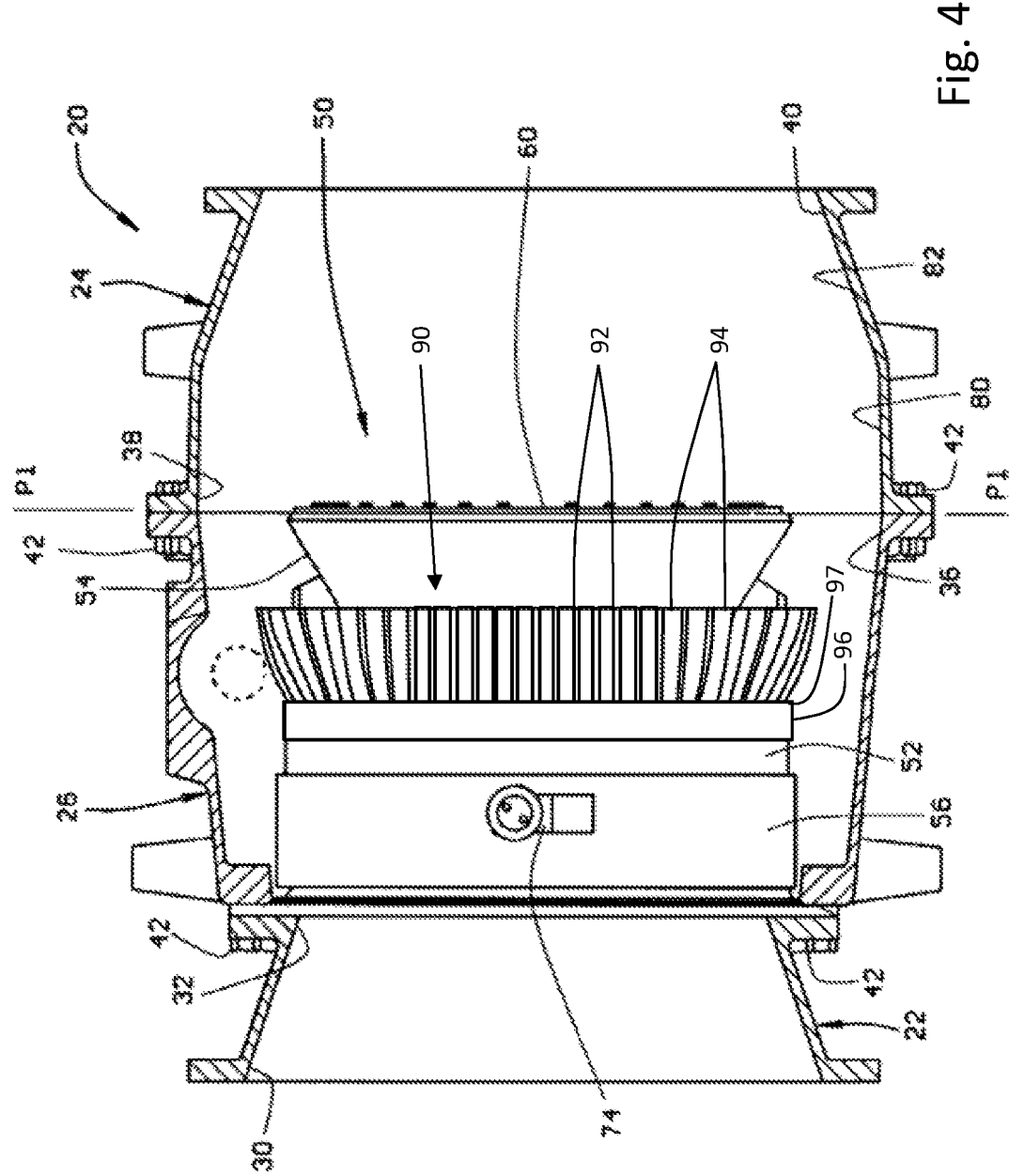
FIG. 4 is a partial cross-sectional elevation view of the fixed cone sleeve shown in an open position.
Figure 5:
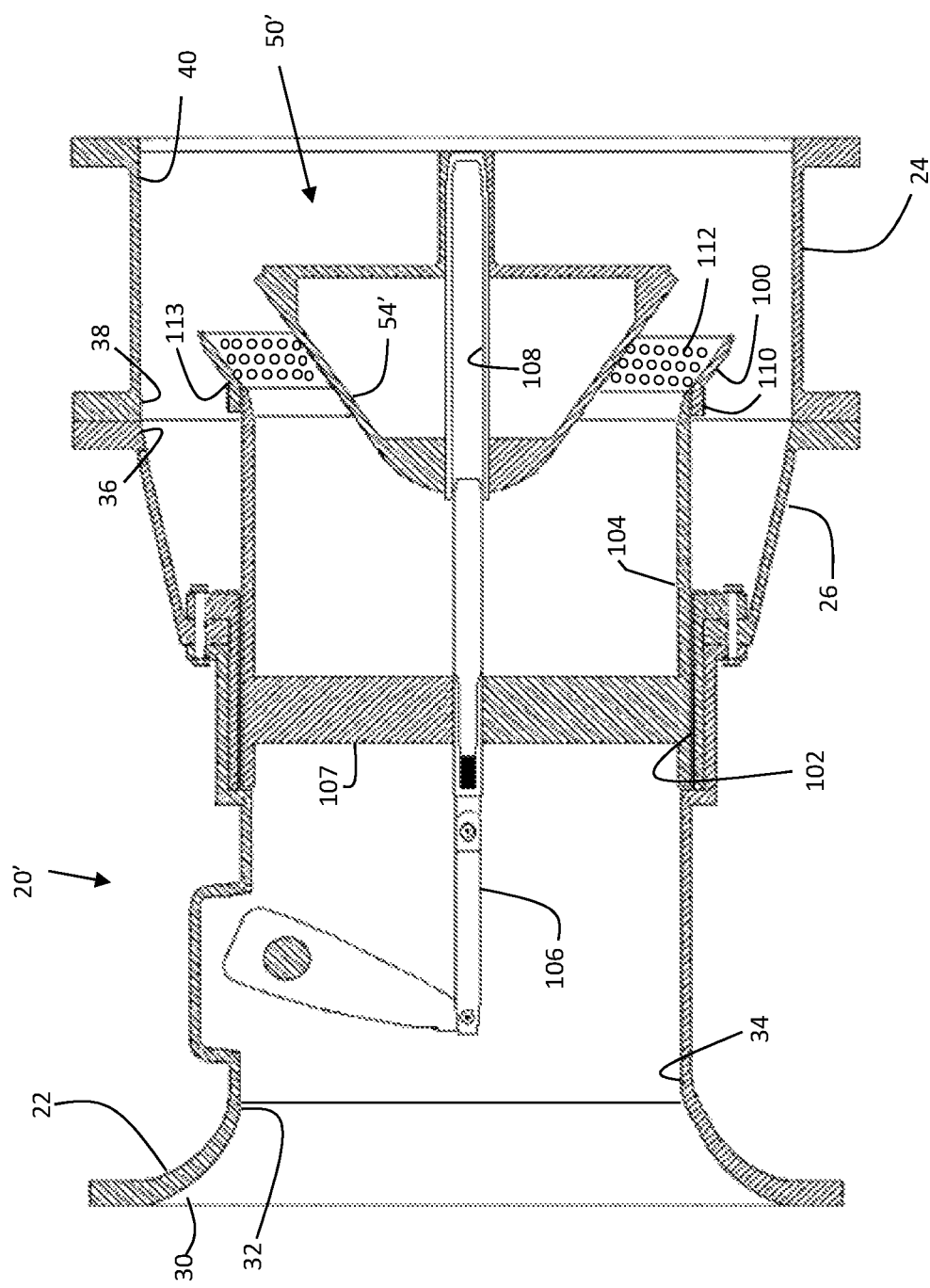
FIG. 5 is a partial cross-sectional elevation view of another embodiment of a fixed cone sleeve in a closed position.
Figure 6:
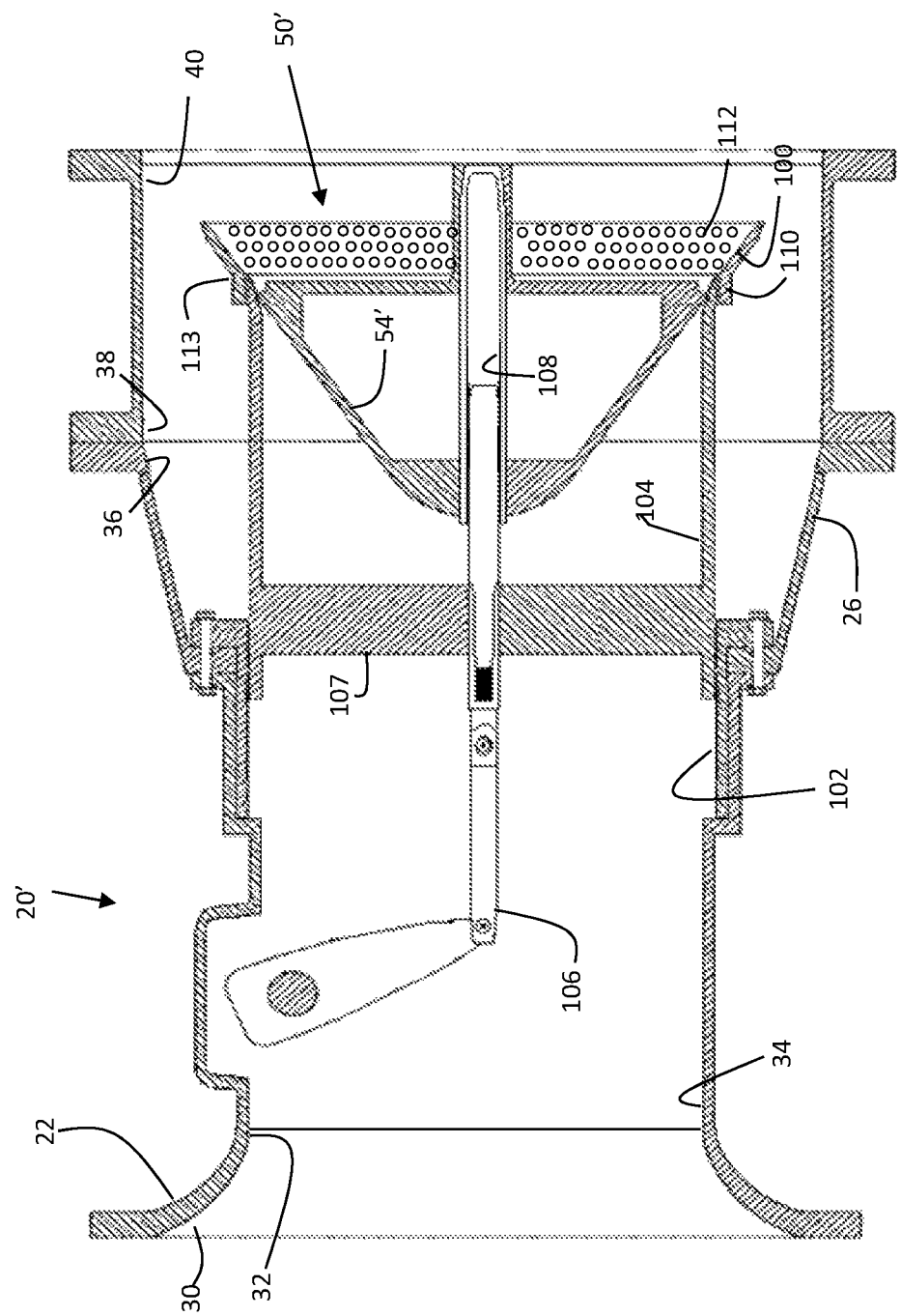
FIG. 6 is a partial cross-sectional elevation view of the fixed cone sleeve of FIG. 5 shown in an open position.

Axial movement of the sleeve gate is powered by a sleeve valve drive assembly, which is represented generally in FIG. 2 by the reference numeral 64. The drive assembly 64 generally comprises an external control mechanism 66, a pair of external drive arms 68 and, as shown in FIGS. 5 and 6, further comprises a pair of internal drive arms 70 a shaft 72 on which the internal and external drive arms 68 and 70 rotate, and a drive block 74. As shown in FIG. 2, the external control mechanism 66 includes a wheel 76 for manual operation of the drive assembly 64. The wheel 76 is operatively connected to the external drive arms 68 in a manner so that rotation of the wheel 76 results in movement of the external drive arms 68 which results in movement of the sleeve gate 56 between the open and closed positions. The internal drive arms 70 are connected to the shaft 72 and rotate with the external drive arms 68 about the shaft 72. The sleeve valve drive block 74 is mounted to the exterior surface of the sleeve gate 56. An identical sleeve valve drive block (not shown) is mounted to the opposite side of the sleeve gate 56. As shown in FIGS. 3 and 4, the internal drive arms 70 are connected to the drive blocks 74 for driving the sleeve gate 56 between its closed position (shown in FIG. 3) and its open position (shown in FIG. 4).

The downstream conduit 24 may be configured to serve as a reducer for constricting the flow of fluid issued from the valve assembly 50, and for directing the flow of fluid into a downstream pipeline (not shown).

The interior volume of the downstream conduit 24 may have a cross-sectional area at its input end 38 that is equal to a cross-sectional area of the interior volume of the valve housing 26 at its downstream end 36. Also, the interior volume of the downstream conduit 24 may have a cross-sectional area at its output end 40 that is smaller than the cross-sectional area at its input end 38, so that the downstream conduit 24 serves as a reducer.

Preferably, the downstream conduit 24 is comprised of a first body section 80 and a second body section 82 downstream of the first body section 80. The first body section 80 may be adjacent to the input end 38 and may have a generally cylindrical configuration with a constant interior diameter as it extends from the input end 38 of the downstream conduit 24 toward the output end 40 thereof.

The second body section 82 of the downstream conduit 24 may extend in the downstream direction from the first body section 80 to the output end 40 of the downstream conduit 24. The second body section 82 of the downstream conduit 24 may have a generally conical configuration with a cross-sectional diameter that decreases as the second body section 82 extends from the first body section 80 toward the output end 40 of the downstream conduit 24. The first body section 80 may serve as a spacer that spaces the conical second body section 82, which serves as a reducer, from the downstream end 36 of the valve housing 26 and from the base 60 of the cone valve seat 54.

The first and second body sections 80 and 82 of the downstream conduit 24 may be integral with one another. The downstream conduit 24 may be a single, monolithic unit between its input end 38 and output end 40. This provides a smooth transition from the interior surface of the first body section 80 to the interior surface of the second body section 82. Alternatively, the two body sections could be separate lengths of conduit held together by mechanical fasteners. It has been found that, due to the high velocity of the jet issuing from the valve assembly 50, the interior of the downstream conduit 24 should be as smooth and streamlined as possible in order to achieve maximum flow capacity and cavitation limits. It has been found that the use of spacers 80 between the valve assembly 50 and the conical second body section 82 delay the constriction of the flow and thereby enhance the flow capacity and cavitation limits associated with the system. The axial length of the first body section or spacer 80 also has been found to be helpful in reducing or eliminating cavitation in the liquid discharged from a fixed cone sleeve valve that is operated as an in-line control valve. Through experimentation it has been determined that the optimum reduction in cavitation can be obtained by dimensioning the spacer 80 with an axial length that is one-half (½) of the interior diameter of the inner conduit 52 of the sleeve valve 56 and with an interior diameter that is one and one-half (1½) times the interior diameter of the inner conduit 52. For example, if the interior diameter of the inner conduit 52 is six feet, then the spacer 80 will have an interior diameter along its entire axial length of nine feet and will have an axial length of three feet. This axial dimension of the spacer 80 spaces the reducer 82 three feet from the plane P1 in which the base 60 of the cone valve is positioned. Note also that the dimensions of the interior diameter of the valve inner conduit 52 also determine the diameter of the valve housing 26 at its downstream end 36. The interior diameter of this end of the housing matches the interior diameter determined for the spacer 80. The relative dimensions of the component parts and their ratios to each other could be varied slightly without significantly affecting the operation of the valve housing assembly 20 in reducing or eliminating cavitation.

Also, it has been found that a curved (e.g., frusto-conically shaped) extension member 90 with openings 92 placed on the downstream axial end of the sleeve gate 56 provides cavitation suppression and eliminates vortex shedding. The curved extension member openings 92 may be slots circumferentially spaced about and extending through a distal end of the extension member opposite defining axial extending fingers 94. An annular support surface 96 may be provided opposite the distal end of the curved extension member 90. The annular support surface may be mounted adjacent to an axial end of the sleeve gate 56. The slots 92 may terminate at an annular support surface 96, thus providing the effect that the fingers 94 expand radially and axially outward from the annular support surface 96 to provide an overall, general frusto-conical shape for the extension member. The slots 92 may extend in a direction upstream from the distal end of the curved extension member to a transition point 97 between the annular support surface 96 and the curved or frusto-conical shaped portion of the extension member 90. In the alternative, the fingers and/or annular support surface may be monolithically formed with the sleeve gate. In the alternative, each of the fingers may be individually mounted to the outer diameter surface of the sleeve gate. In the alternative (for instance as shown in connection with the fixed cone valve of FIGS. 5 and 6), the curved extension member 100 may be perforated. As will be described in more detail below, the outer diameter surface of the sleeve gate 56 may be arranged with a locator surface for locating the annular support surface of the curved extension member or each individual finger, as applicable depending upon the configuration. The locator surface may be a circumferential recess or groove formed in the sleeve gate. The curved extension member 90, and particularly, the annular support surface 96, may be heat shrunk or mechanically fastened onto the sleeve gate 56 in the locator surface.

FIGS. 5 and 6 show another embodiment of a fixed cone valve 20'. The fixed cone valve has a fixed cone valve body 50' supported in the downstream conduit 24. Additionally, the upstream portion of the valve housing 26 contains a liner 102 in which the sleeve gate 104 translates in reciprocating motion relative to the fixed cone valve body 50' via a linkage 106. The liner 102 may be disposed adjacent to or in a counterbore or shoulder formed in the valve housing 26. The linkage 106 may be arranged to extend through the center axis of the sleeve gate 104 and the fixed cone valve body 54', and may be controlled with an actuator (not shown) similar to that described above, but connected to the sleeve gate 104 at its center axis, rather than diametrically opposite, outer radial edges of the sleeve gate as described above in connection with FIGS. 3 and 4. Accordingly, the sleeve gate 104 may move between an open position as shown in FIG. 5 and a closed position as shown in FIG. 6, sliding within an inner diameter surface of the liner 102. Thus, the sleeve gate 104 may have an outer diameter surface which is closely matched with inner diameter surface of the liner 102 of the valve housing thereby allowing the sleeve gate to move with reciprocating motion between the open and close position within the fixed cone valve body. Radial extending ribs 107 may extend between the sleeve gate 104 and the linkage 106 so that movement of the linkage affects the linear motion of the sleeve gate between the open and close positions relative to the fixed cone valve body. The fixed cone valve body 54' may have an internal sleeve 108 which guides the linkage 106 to facilitate providing linear motion of the sleeve gate 104 relative to the fixed cone valve body.

In FIGS. 5 and 6, the curved extension member 100 of the sleeve gate 104 has a frusto-conically shaped perforate member with an annular support surface 110 operatively mounted to the distal end of the sleeve gate. Perforations 112 in the conically shaped curve extension member 100 may be sufficient in size and number to enable higher pressure to pass through the curved extension member into the high velocity low pressure flow region between the sleeve gate 104 and fixed cone valve body 54', to suppress cavitation as will be explained. In the alternative, the sleeve gate 104 may have a curved extension member with fingers attached to its distal end, as described above and/or shown in FIGS. 3 and 4. In the alternative, the fingers or the frusto-conically shaped, perforate, curved extension member may be monolithically formed with the sleeve gate.

The openings in the curved extension members (whether spacing 92 between the circumferential fingers 94 or perforations 112) allows higher pressure (e.g., atmospheric pressure) in the radially outward portion of the valve body around the sleeve gate and outer surface of the curved extension member to flow into the lower pressure flow regions exiting between the sleeve gate seal and the fixed cone valve body, thereby suppressing and eliminating cavitation in the flow downstream of the sleeve gate. The transition point 113 of the annular support surface to the frusto-conical shape of the extension member may be positioned at a distance 115, which may be approximately 0.125 inches from the distal end the sleeve gate. The frusto-conical shape of the extension member may be defined by the cooperative effect of the circumferential fingers 94 or the perforated 112 portion of the extension member. The openings in the curved extension member provide a conduit through which a higher static pressure fluid meets the flow exiting the seat on the sleeve gate, thereby suppressing the first stage of cavitation and negating the existence of the second stage of cavitation where collapsing voids (i.e., vortex shedding) can cause damage to adjacent surfaces. For instance, cavitation suppression may be achieved when the lower pressure flow exiting the sleeve gate seat and fixed cone valve body seat immediately mixes with higher pressure water or air travelling through the openings of the curved extension member. The higher pressure water may comprise adjacent higher static pressure water or air on and around the circumferential outer surface of the curved extension member. The curvilinear shape of the curved extension member also provides linear flow when the sleeve gate is moved from the full open position to the closed and seated position without any vibration or lateral oscillations of the sleeve gate during movement to the closed and seated position.

In one example of a six inch (6") fixed cone sleeve valve, the curved extension member may comprise fingers. The outer diameter surfaces of the fingers may have a conical shape which expands outward and the curvilinear length of the fingers may be about 25% of the sleeve gate diameter or 1½ inch long. The slots (or fingers) of the curved extension member, which may coincide with the transition point 97, may be positioned a distance approximately 0.125 inches upstream from the sleeve gate seat edge. The curved extension member may be located in this position by machining a tapered circumferential groove in the outer diameter surface of the downstream end of the gate sleeve. The taper may be about 3 degrees and extend 1 inch back from the sharp seat edge, thereby forming an approximate ¹⁄₃₂ inch deep circumferential recess in the outer diameter surface of the sleeve gate. The curved extension member may have a matching 3 degree profile. The curved extension member may have a thermal coefficient of expansion greater than the gate sleeve, thereby allowing the curved extension member to be heated (and consequently expanded) to fit over the outer diameter surface of the gate sleeve, and then cooled to shrink fit on to the gate sleeve in the circumferential recess. The sleeve gate may be designed to allow for maximum flow at the sharp edge seat. By positioning the curved extension member finger assembly slightly upstream of the sharp edge seat of the sleeve gate an approximate 0.100 inch circumferential gap may be formed between the outer surface of the boundary layer of the exiting flow and the inner or underside of the fingers. This gap functions as a circumferential plenum adjacent to the exiting flow and into which the higher pressure from areas adjacent to the outer diameter of the curved extension member and the fingers may be directed with circumferential application against the low pressure, high velocity flow exiting from between the sleeve gate seat and the fixed cone seat. This effect assists in dissipating the low pressure, in the high velocity flow exiting the sharp seat edge and suppresses the formation of cavitation. Although a 6 inch fixed cone valve is generally described above, the dimensions and design criteria may be applied proportionally to larger valves.

Figure 7:
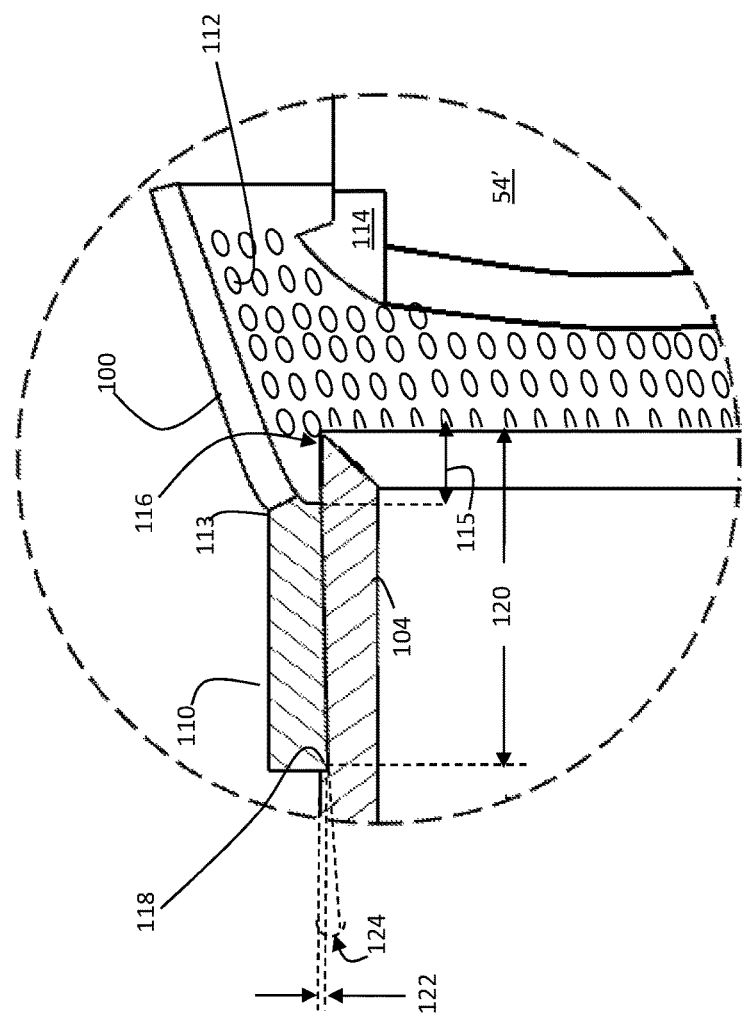
FIG. 7 is an enlarged detail view of a finger on the sleeve gate of the fixed cone sleeve valve.

In another example of a six inch (6") fixed cone sleeve valve (similar to that of the embodiment shown in FIGS. 5 and 6, the detail view shown in FIG. 7), the seat on the sleeve gate 104 may seal against the fixed cone valve body 54', and in particular, against an elastomeric seal 114 attached to the fixed cone valve body. The seat of the sleeve gate 104 may be machined with a sharp edge having an outside diameter 116 equal to the inside diameter of the liner 102. The sleeve gate 104 may be bidirectionally sealed against the elastomeric seal of the fixed cone valve body 54'. The sleeve gate may have a circumferential tapered groove or recess 118 having a length 120, a depth 122, and an angle 124. The annular support surface 110 of the curved extension member 100 may be fitted within the tapered groove. The curved extension member may be positioned approximately 0.125 inches upstream from the sleeve gate seat edge. The length 120 of the groove 118 from the distal end of the sleeve gate 104 may be approximately 1 inch, the taper angle 124 may be about 3 degrees, and the maximum depth of the tapered recess 22 may be approximately 1/32 inch. The annular support surface 110 of the curved extension member 100 may have a matching profile thereby enabling the curved extension member to fit within the recess. The curved extension member 100 may be positioned such that it has a 0.100 inch circumferential gap with the outer diameter of the boundary layer of the exiting flow, thereby allowing high pressure to be directed through the curved extension member into the flow exiting between the seal gate and the fixed cone valve body to suppress cavitation.

As various changes could be made without departing from the scope of the invention, it is intended that all matter contained in the above description or shown in the accompanying drawings shall be interpreted as illustrative and not in a limiting sense.

What is claimed is:

1. A fixed cone sleeve valve comprising:
   a valve housing having an upstream inlet and a downstream outlet:
   a conically shaped valve body;
   a sleeve gate having an upstream proximal end and a downstream distal end, the sleeve gate being movable relative to the conically shaped valve body between an open position in which the sleeve gate distal end is spaced from the conically shaped valve body to define a flow path for a flow of a liquid between the sleeve gate and the conically shaped valve body, and a closed position in which the sleeve gate engages the conically shaped valve body in a manner to close the flow path and prevent a flow of a liquid between the sleeve gate and the conically shaped valve body; and
   an extension member extending radially outward and axially downstream from the downstream, distal end of the sleeve gate, the extension member having outer and inner surfaces with openings extending between the outer and inner surfaces, the extension member being arranged on the sleeve gate in a manner to allow communication through the openings into the flow path when the sleeve gate is in the open position.

2. The valve of claim 1 wherein the sleeve gate has a locator formed on an outer diameter of the sleeve gate distal end, wherein the locator comprises a recess.

3. The valve of claim 2 wherein the recess is tapered.

4. The valve of claim 2 wherein the extension member is mounted to the sleeve gate within the recess.

5. The valve of claim 1 wherein the extension member has a plurality of perforations.

6. The valve of claim 1 wherein the conically shaped valve body is mounted within the valve housing.

7. A fixed cone sleeve valve comprising:
   a valve housing having an upstream inlet and a downstream outlet:
   a conically shaped valve body;
   a sleeve gate having an upstream proximal end and a downstream distal end, the sleeve gate being movable relative to the conically shaped valve body between an open position in which the sleeve gate distal end is spaced from the conically shaped valve body to define a flow path for a flow of a liquid between the sleeve gate and the conically shaped valve body, and a closed position in which the sleeve gate engages the conically shaped valve body in a manner to close the flow path and prevent a flow of a liquid between the sleeve gate and the conically shaped valve body; and
   an extension member extending radially outward and axially downstream from the downstream, distal end of the sleeve gate, the extension member having outer and inner surfaces with openings extending between the outer and inner surfaces, the extension member being arranged on the sleeve gate in a manner to allow communication through the openings into the flow path when the sleeve gate is in the open position, wherein the extension member comprises a plurality of axially extending slits circumferentially spaced about the extension member and extending through a downstream axial end of the extension member.

8. The valve of claim 1 wherein the conically shaped valve body is mounted to an internal conduit subcircumjacent to the sleeve gate.

9. A fixed cone sleeve valve comprising:
   a valve housing having an upstream inlet and a downstream outlet:
   a conically shaped valve body;
   a sleeve gate having a upstream proximal end and a downstream distal end, the sleeve gate being movable within the valve housing between an open position in which the sleeve gate distal end is spaced from the conically shaped valve body to define a flow path for a flow of a liquid between the sleeve gate and the conically shaped valve body, and a closed position in which the sleeve gate engages the conically shaped valve body in a manner to close the flow path and prevent a flow of a liquid between the sleeve gate and the conically shaped valve body; and
   an extension member at the downstream distal end of the sleeve gate, the extension member having outer and inner surfaces with openings extending between the outer and inner surfaces, the inner surface in part defining the flow path of a liquid downstream of the sleeve gate when the sleeve gate is the open position, the extension member openings allowing communication from internal areas of the valve housing that are adjacent to the extension member outer surface into the flow path when the sleeve gate is in the open position.

10. The valve of claim 9 wherein the extension member has an annular support surface adjacent to the distal end of the sleeve gate.

11. The valve of claim 10 wherein the distal end of the sleeve gate has a circumferential recess.

12. The valve of claim 11 wherein the annular support portion is mounted within the recess of the distal end of the sleeve gate.

13. The valve of claim 10 wherein a curvilinear length of the radially and axially extending portion of the extension member is about 25 percent of a diameter of the sleeve gate.

14. The valve of claim 10 wherein a downstream distal edge of the annular support surface is upstream of the distal end of the sleeve gate.

15. The valve of claim 10 wherein the extension member has a portion that extends radially outward and axially downstream from the annular support surface.

16. The valve of claim 15 wherein the extension member has a plurality of perforations in the radially and axially extending portion.

17. A fixed cone sleeve valve comprising:
   a valve housing having an upstream inlet and a downstream outlet;
   a conically shaped valve body;
   a sleeve gate having a upstream proximal end and a downstream distal end, the sleeve gate being movable within the valve housing between an open position in which the sleeve gate distal end is spaced from the conically shaped valve body to define a flow path for a flow of a liquid between the sleeve gate and the conically shaped valve body, and a closed position in which the sleeve gate engages the conically shaped valve body in a manner to close the flow path and prevent a flow of a liquid between the sleeve gate and the conically shaped valve body; and
   an extension member at the downstream distal end of the sleeve gate, the extension member having outer and inner surfaces with openings extending between the outer and inner surfaces, the inner surface in part defining the flow path of a liquid downstream of the sleeve gate when the sleeve gate is the open position, the extension member openings allowing communication from internal areas of the valve housing that are adjacent to the extension member outer surface into the flow path when the sleeve gate is in the open position, wherein the extension member has an annular support surface adjacent to the distal end of the sleeve gate, wherein the annular support portion is heat shrunk to the distal end of the sleeve gate.

18. A fixed cone sleeve valve comprising:
   a valve housing having an upstream inlet and a downstream outlet;
   a conically shaped valve body;
   a sleeve gate having a upstream proximal end and a downstream distal end, the sleeve gate being movable within the valve housing between an open position in which the sleeve gate distal end is spaced from the conically shaped valve body to define a flow path for a flow of a liquid between the sleeve gate and the conically shaped valve body, and a closed position in which the sleeve gate engages the conically shaped valve body in a manner to close the flow path and prevent a flow of a liquid between the sleeve gate and the conically shaped valve body; and
   an extension member at the downstream distal end of the sleeve gate, the extension member having outer and inner surfaces with openings extending between the outer and inner surfaces, the inner surface in part defining the flow path of a liquid downstream of the sleeve gate when the sleeve gate is the open position, the extension member openings allowing communication from internal areas of the valve housing that are adjacent to the extension member outer surface into the flow path when the sleeve gate is in the open position, wherein the extension member has an annular support surface adjacent to the distal end of the sleeve gate wherein the extension member has a portion that extends radially outward and axially downstream from the annular support surface, wherein the extension member comprises a plurality of axially extending slits circumferentially spaced about and extending through a downstream distal axial end of the radially and axially extending portion.

19. The valve of claim 18 wherein the plurality of axially extending slits circumferentially spaced about and extending through the distal axial end of the radially and axially extending portion of the extension member extend upstream to the annular support surface.

* * * * *